US012476374B2

(12) United States Patent
Inafune et al.

(10) Patent No.: US 12,476,374 B2
(45) Date of Patent: Nov. 18, 2025

(54) ANTENNA

(71) Applicant: KABUSHIKI KAISHA TOKAI RIKA DENKI SEISAKUSHO, Aichi (JP)

(72) Inventors: Koji Inafune, Aichi (JP); Kenichi Koga, Aichi (JP); Tatsuya Koike, Aichi (JP); Satoshi Mori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 445 days.

(21) Appl. No.: 18/061,159

(22) Filed: Dec. 2, 2022

(65) Prior Publication Data

US 2023/0187831 A1 Jun. 15, 2023

(30) Foreign Application Priority Data

Dec. 14, 2021 (JP) ................................ 2021-202575

(51) Int. Cl.
*H01Q 13/08* (2006.01)
*H01Q 5/25* (2015.01)
*H01Q 9/04* (2006.01)
*H01Q 21/24* (2006.01)

(52) U.S. Cl.
CPC ............. *H01Q 9/0428* (2013.01); *H01Q 5/25* (2015.01); *H01Q 21/24* (2013.01)

(58) Field of Classification Search
CPC ........ H01Q 9/0428; H01Q 5/25; H01Q 21/24; H01Q 9/0464; H01Q 21/065; H01Q 9/42; H01Q 9/0421; H01Q 1/50; H01Q 1/12; H01Q 1/38
See application file for complete search history.

(56) References Cited

U.S. PATENT DOCUMENTS 6,167,286 A * 12/2000 Ward .................. H04B 7/0491 455/562.1
6,710,742 B1 * 3/2004 Meredith ................ H01Q 3/28 342/372

(Continued)

FOREIGN PATENT DOCUMENTS

CN 105048081 B * 9/2018 ............... H01Q 1/38
JP 2005252585 A * 9/2005 ............ H01Q 13/06
JP 2012120069 A * 6/2012 ............ H01Q 13/06

*Primary Examiner* — Dimary S Lopez Cruz
*Assistant Examiner* — Bamidele A Immanuel
(74) *Attorney, Agent, or Firm* — Greenblum & Bernstein, P.L.C.

(57) ABSTRACT

There is provided an antenna that transmits and receives a wireless signal compliant with a designated communication standard, the antenna comprising: a metal plate that is disposed on a circuit board; a first supporting section that supports the metal plate and connects the metal plate to a feed point formed on the circuit board; at least one second supporting section that supports the metal plate and connects the metal plate to a ground plane formed on the circuit board; and a plurality of extension sections that extend from an outer edge of the metal plate toward a direction of the circuit board but have no contact with the circuit board; wherein the plurality of extension sections operate as perturbation elements that form two excitation modes, the two excitation modes spatially intersecting with one other.

4 Claims, 9 Drawing Sheets

(56) References Cited

U.S. PATENT DOCUMENTS

| | | | | |
|---|---|---|---|---|
| 6,788,661 | B1 * | 9/2004 | Ylitalo | H04W 52/42 370/320 |
| 2005/0099340 | A1 * | 5/2005 | Suzuki | H01Q 9/0442 343/700 MS |
| 2005/0116875 | A1 * | 6/2005 | Yuanzhu | H01Q 9/0442 343/846 |
| 2005/0206568 | A1 * | 9/2005 | Phillips | H01Q 5/40 343/700 MS |
| 2006/0220961 | A1 * | 10/2006 | Tinsley | H01Q 9/045 343/700 MS |
| 2015/0236421 | A1 * | 8/2015 | Zemliakov | H01Q 9/0435 343/700 MS |
| 2018/0367199 | A1 * | 12/2018 | Zimmerman | H01Q 25/001 |
| 2022/0416447 | A1 * | 12/2022 | Jakobsson | H04B 7/0617 |

* cited by examiner

10

ANTENNA

CROSS REFERENCE TO RELATED APPLICATION(S)

This application is based upon and claims benefit of priority from Japanese Patent Application No. 2021-202575, filed on Dec. 14, 2021, the entire contents of which are incorporated herein by reference.

BACKGROUND

The present invention relates to an antenna.

In recent years, systems of estimating a signal's angle-of-arrival based on a phase difference of arrival (PDoA) have been developed. To achieve the above-described angle-of-arrival estimation, a circularly polarized patch antenna disclosed in JP 2012-120069 A is used, for example.

SUMMARY

To ensure desired antenna characteristics, the circularly polarized patch antenna is often disposed on a high-frequency substrate that is expensive and that has a predetermined thickness or more. This results in increase in manufacturing cost.

In addition, if an array antenna is used for the angle-of-arrival estimation, downsizing of the antennas is required.

Accordingly, the present invention is made in view of the aforementioned issues, and an object of the present invention is to achieve a cheaper and smaller antenna.

To solve the above described problem, according to an aspect of the present invention, there is provided an antenna that transmits and receives a wireless signal compliant with a designated communication standard, the antenna comprising: a metal plate that is disposed on a circuit board; a first supporting section that supports the metal plate and connects the metal plate to a feed point formed on the circuit board; at least one second supporting section that supports the metal plate and connects the metal plate to a ground plane formed on the circuit board; and a plurality of extension sections that extend from an outer edge of the metal plate toward a direction of the circuit board but have no contact with the circuit board; wherein the plurality of extension sections operate as perturbation elements that form two excitation modes, the two excitation modes spatially intersecting with one other.

As described above, according to the present invention, it is possible to achieve the cheaper and smaller antenna.

DETAILED DESCRIPTION OF THE EMBODIMENT(S)

Figure 1:
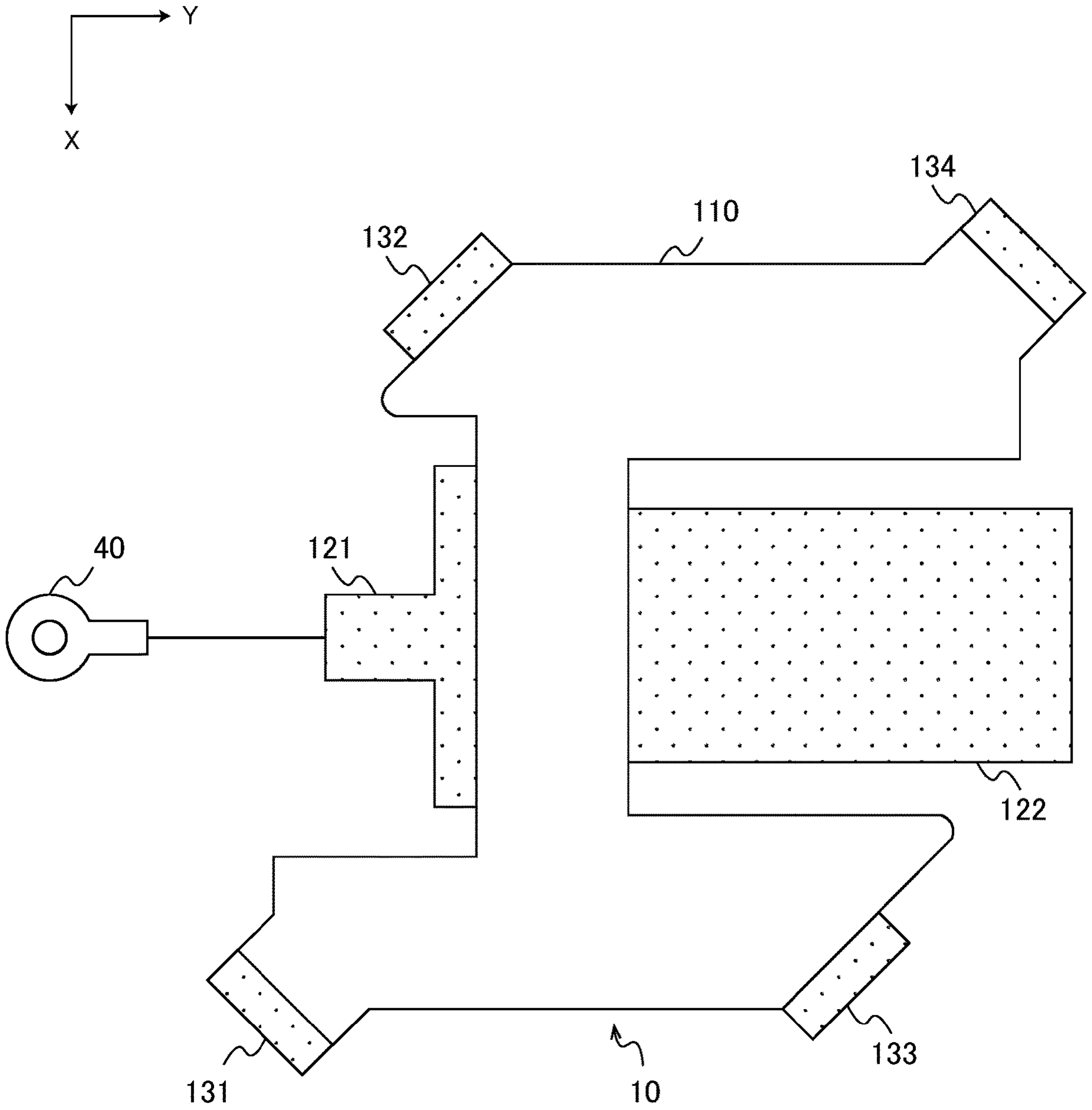
FIG. 1 is a top view of an antenna 10 according to a first embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Overview>

As described above, general circularly polarized antennas use expensive high-frequency substrates. Therefore, manufacturing costs thereof tend to increase.

Alternatively, if patch antennas include the metal plates alone without using the high-frequency substrates, there is a concern that the antennas get larger in size.

This is because the structure including no high-frequency substrate cannot downsize the antenna while the structure including the high-frequency substrate can shorten the wavelength on the basis of permittivity and can downsize the antenna.

Therefore, it is necessary to introduce some means to downsize the antenna in the case of configuring the patch antenna, in particular the array antenna, without using the high-frequency substrate.

For example, in the array antenna for achieving the angle-of-arrival estimation, respective antennas have to be disposed at an interval that is a half or less of wavelength $\lambda$ of a signal.

Accordingly, if the single antenna has a size more than $\frac{1}{2}\lambda$, it is extremely difficult to configure the array antenna.

The technical idea of an embodiment of the present invention was conceived by focusing on the above-described points, and is intended to achieve the cheaper and smaller antenna.

Next, details of antenna configurations according to two embodiments will be described.

<2. First Embodiment>

First, a first embodiment of the present invention will be described.

An antenna 10 according to a first embodiment of the present invention is a circularly polarized antenna configured to transmit and receive wireless signals in conformity with a designated communication standard.

Examples of the designated communication standard include an ultra-wideband (UWB) wireless communication.

Next, a configuration example of the antenna 10 according to the present embodiment will be described with reference to FIG. 1 to FIG. 3.

FIG. 1 is a top view of the antenna 10 according to the first embodiment of the present invention. FIG. 2 is a side view of the antenna 10 according to the embodiment. FIG. 3 is a perspective view of the antenna 10 according to the embodiment.

Figure 2:
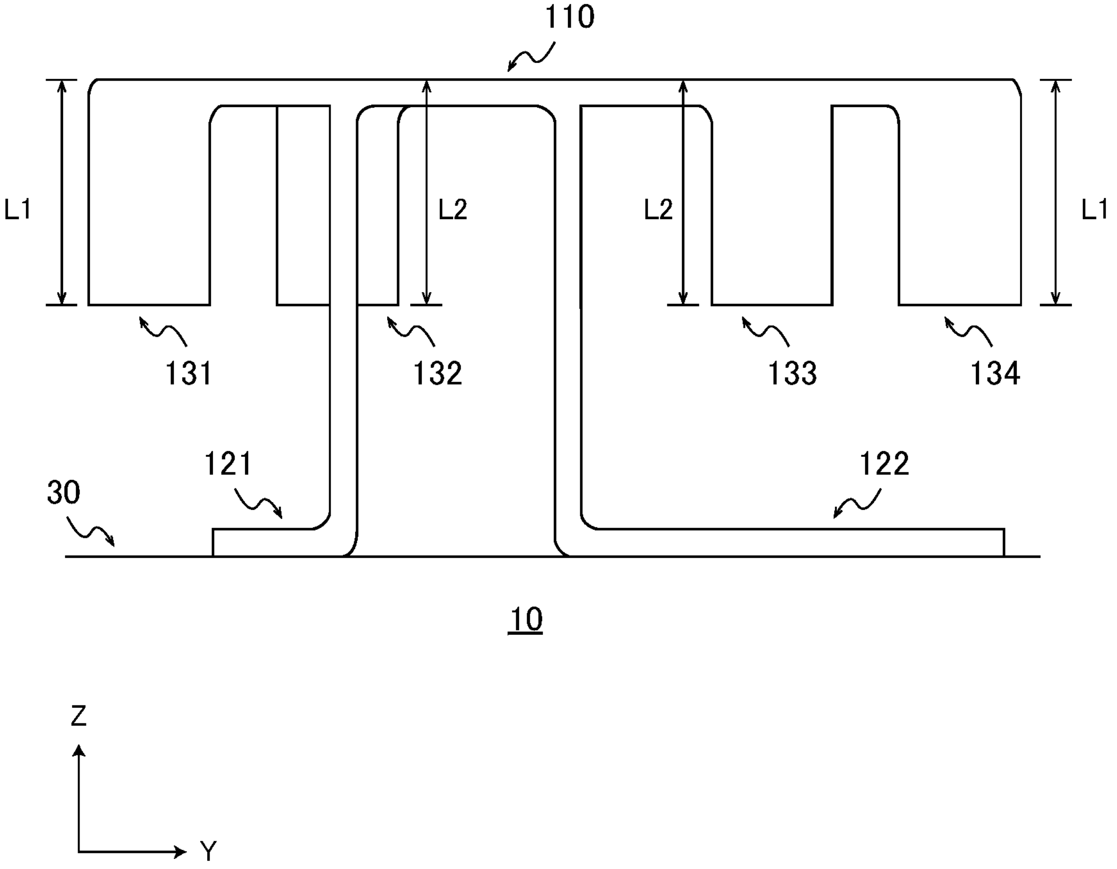
FIG. 2 is a side view of the antenna 10 according to the embodiment.
Figure 3:
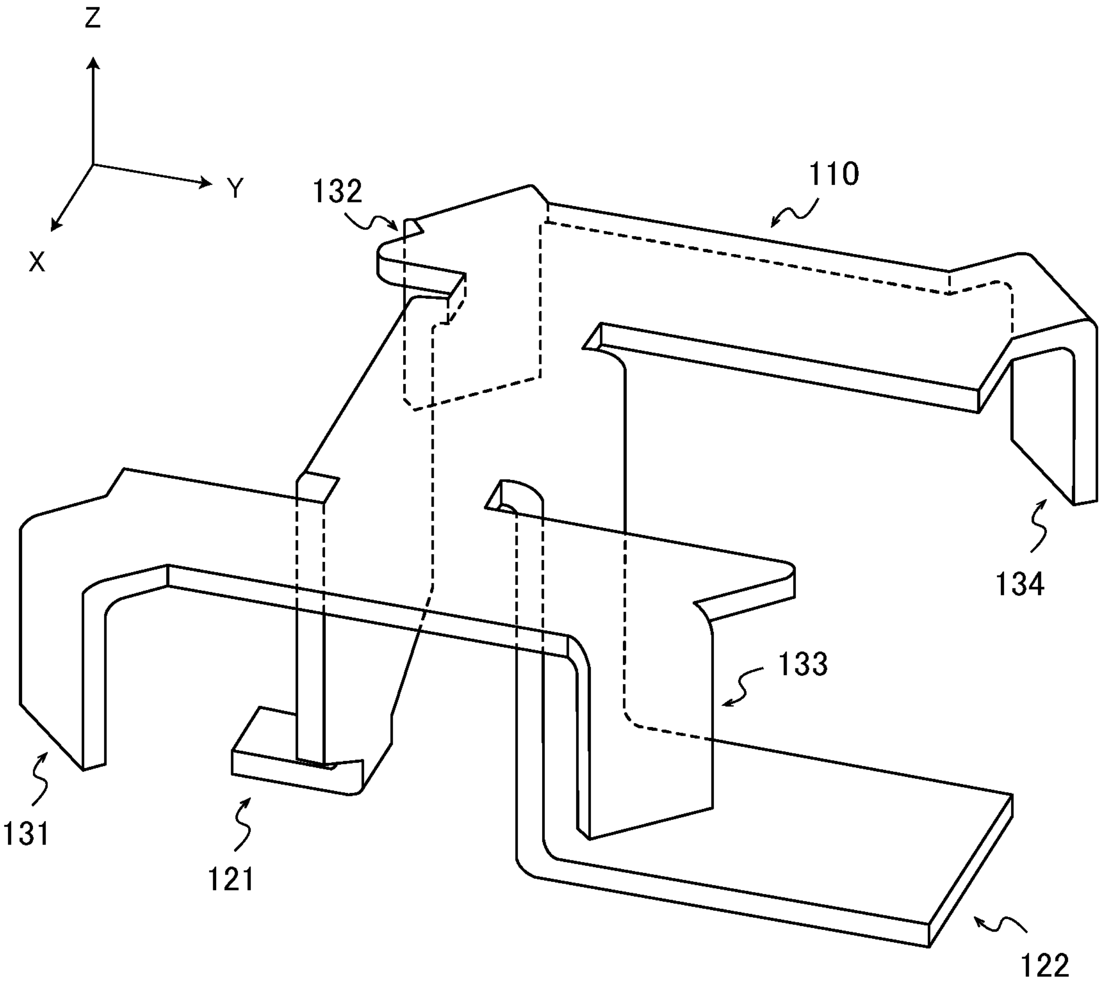
FIG. 3 is a perspective view of the antenna 10 according to the embodiment.

As illustrated in FIG. 1 to FIG. 3, the antenna 10 according to the present embodiment includes a metal plate 110, a first supporting section 121, a second supporting section 122, and four extension sections 131 to 134.

The metal plate 110, the first supporting section 121, the second supporting section 122, and the four extension sections 131 to 134 may be integrally formed by using metal material.

Note that, to clarify boundaries between the respective sections, FIG. 1 emphasizes the first supporting section 121, the second supporting section 122, and the four extension sections 131 to 134 by using a dot pattern.

(Metal Plate 110)

As illustrated in FIG. 2, the metal plate 110 according to the present embodiment is disposed on a circuit board 30.

In addition, as illustrated in FIG. 1 and FIG. 3, the metal plate 110 according to the present embodiment may haven an asymmetric shape that is based on an H shape. This shape makes it possible to generate circularly polarized waves through perturbative excitation to be described below.

(First Supporting Section 121)

As illustrated in FIG. 1 to FIG. 3, the first supporting section 121 according to the present embodiment supports the metal plate 110 and connects the metal plate 110 to a feed point 40 formed on the circuit board 40.

In addition, as illustrated in FIG. 1 to FIG. 3, the first supporting section 121 according to the present embodiment may extend from an outer edge of the metal plate 110 toward a direction of the circuit board 30.

(Second Supporting Section 122)

The second supporting section 122 according to the present embodiment supports the metal plate 110 and connects the metal plate 110 to a ground plane (not illustrated) formed on the circuit board 30.

In addition, as illustrated in FIG. 1 to FIG. 3, the second supporting section 122 according to the present embodiment may extend from the outer edge of the metal plate 110 toward the direction of the circuit board 30.

The first supporting section 121 and the second supporting section 122 allow the antenna 10 to stand on the circuit board 30.

(Extension Section 131 to Extension Section 134)

As illustrated in FIG. 1 to FIG. 3, the extension sections 131 to 134 according to the present embodiment extend from the outer edge of the metal plate 110 toward the direction of the circuit board 30 but have no contact with the circuit board 30.

In addition, one of features of the extension section 131 to the extension section 134 according to the present embodiment is to operate as perturbation elements that form two excitation modes, the two excitation modes spatially intersecting with one other.

Here, an overview of the perturbative excitation will be described. In the case where the two excitation modes spatially having the orthogonal relation are designed to have slightly different resonance frequencies, a phase difference of 90° is imparted in a middle between the two resonance frequencies.

In other words, the perturbative excitation is a method of generating circularly polarized waves depending on the phase difference of 90°.

To achieve the perturbative excitation, the two excitation modes spatially having the orthogonal relation have to be designed to have slightly different resonance frequencies as described above.

Therefore, the metal plate 110 and the extension sections 131 to 134 according to the present embodiment are formed in such a manner that the two excitation modes spatially having the substantially orthogonal relation have respective current paths having different lengths.

For example, in the case of the example illustrated in FIG. 1 to FIG. 3, the length L1 of the extension section 131 and the extension section 134 is identical to the length L2 of the extension section 132 and the extension section 133.

However, with regard to the metal plate 110, a length between a portion connected to the extension section 131 and a portion connected to the extension section 134 is different from a length between a portion connected to the extension section 132 and a portion connected to the extension section 133.

Since the metal plate 110 of the antenna 10 has the above-described shape as exemplified in FIG. 1 to FIG. 3, the excitation mode based on the extension section 131 and the extension section 134 and the excitation mode based on the extension section 132 and the extension section 133 have the respective current paths having different lengths. This can achieve the perturbative excitation.

Note that, FIG. 1 to FIG. 3 illustrate the example in which the length L1 of the extension section 131 and the extension section 134 is identical to the length L2 of the extension section 132 and the extension section 133. However, if the length L1 is different from the length L2, the metal plate 110 may have a substantially symmetric shape.

In addition, if the generated polarized waves are not limited to the circularly polarized waves, the antenna 10 does not have to include the four extension sections.

For example, it is also possible to cause the three extension sections to operate as the perturbation elements, form two excitation modes spatially intersecting with one other, and generate elliptically polarized waves.

In this case, the metal plate 110 may have an asymmetric shape based on a T shape or an L shape.

<3. Second Embodiment>

Next, a second embodiment of the present invention will be described.

In a way similar to the antenna 10 according to the first embodiment, an antenna 20 according to the second embodiment of the present invention is a circularly polarized antenna configured to transmit and receive wireless signals in conformity with a designated communication standard.

Next, a configuration example of the antenna 20 according to the present embodiment will be described with reference to FIG. 4 to FIG. 6.

Note that, hereinafter, a description will be given while focusing on a difference from the antenna 10 according to the first embodiment, and repeated explanation will be omitted with regard to structures that are common to the antenna 10 according to the first embodiment and the antenna 20 according to the second embodiment.

Figure 4:
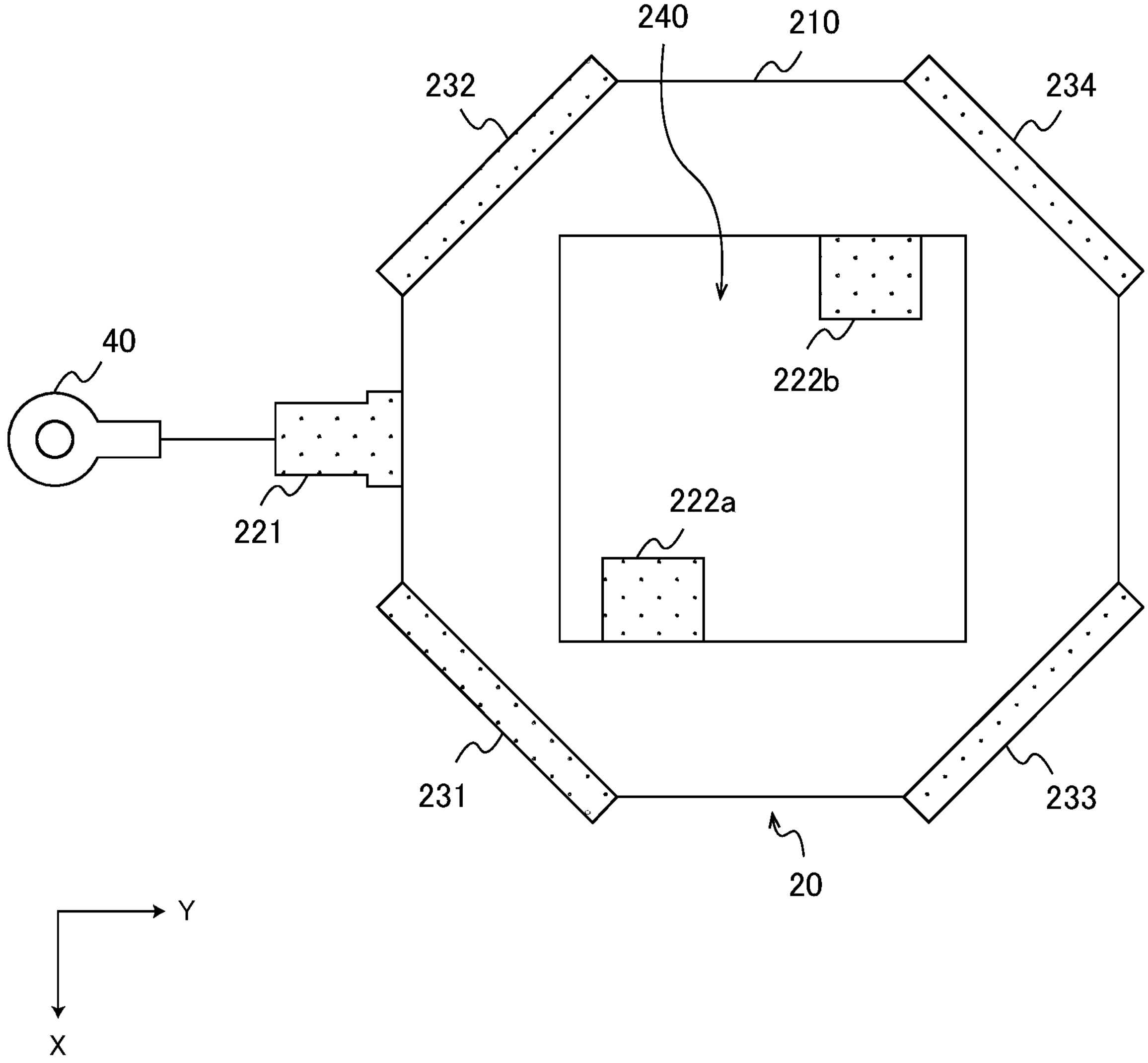
FIG. 4 is a top view of an antenna 20 according to a second embodiment of the present invention.

FIG. 4 is a top view of the antenna 20 according to the second embodiment of the present invention. FIG. 5 is a side view of the antenna 20 according to the embodiment. FIG. 6 is a perspective view of the antenna 20 according to the embodiment.

Figure 5:
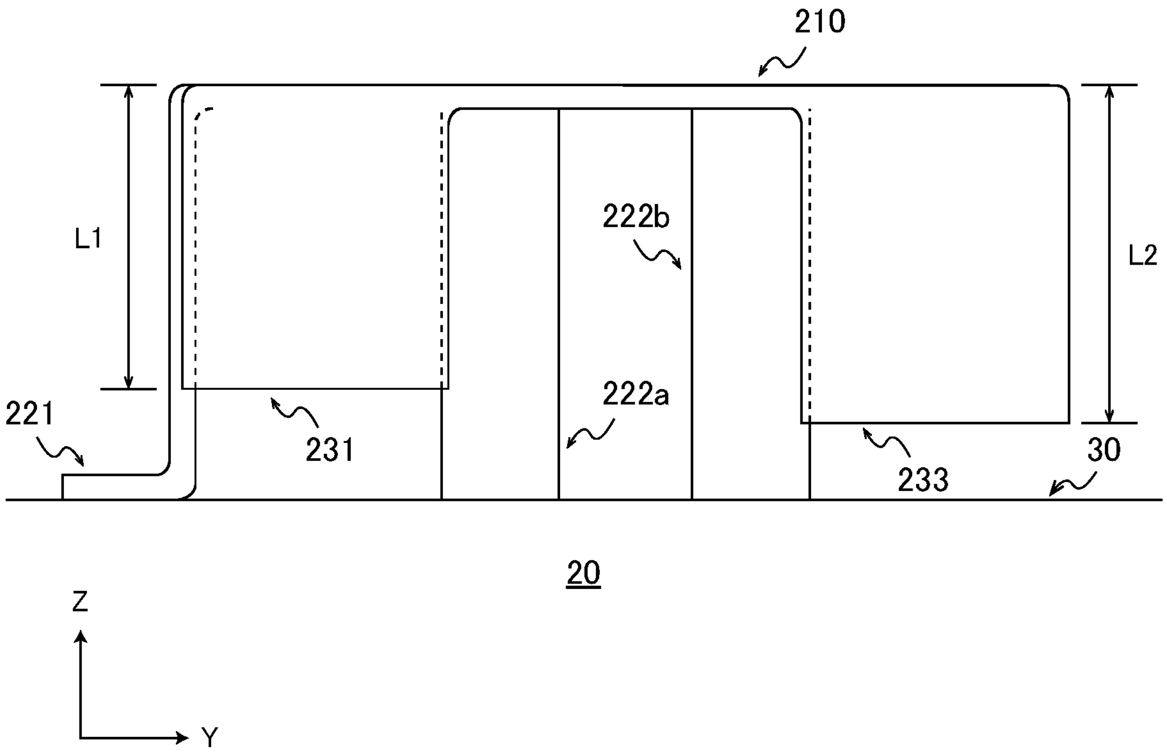
FIG. 5 is a side view of the antenna 20 according to the embodiment.
Figure 6:
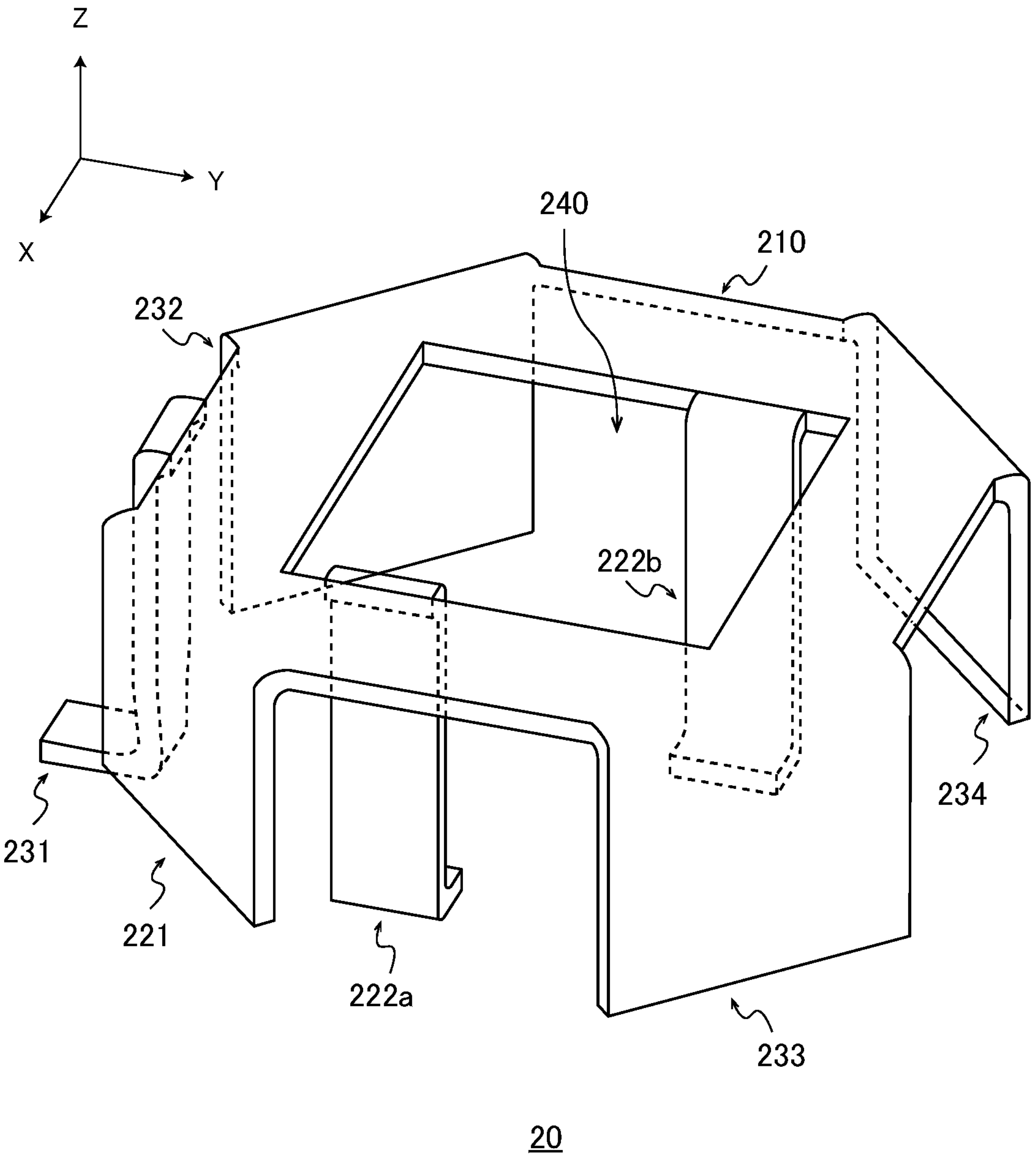
FIG. 6 is a perspective view of the antenna 20 according to the embodiment.

As illustrated in FIG. 4 to FIG. 6, the antenna 20 according to the present embodiment includes a metal plate 210, a first supporting section 221, two second supporting sections 222*a* and 222*b*, four extension sections 231 to 234, and an opening 240.

The metal plate 210, the first supporting section 221, the two second supporting sections 222*a* and 222*b*, and the four extension sections 231 to 234 may be integrally formed by using metal material.

Note that, to clarify boundaries between the respective sections, FIG. 4 emphasizes the first supporting section 221, the two second supporting sections 222*a* and 222*b*, and the four extension sections 231 to 234 by using a dot pattern.

Note that, in FIG. 5, the extension section 232 and the extension section 234 are not illustrated to prioritize visibility.

(Metal Plate 210)

As illustrated in FIG. 4, the metal plate 210 according to the present embodiment is disposed on the circuit board 30.

In addition, as illustrated in FIG. 4 and FIG. 6, the metal plate 210 according to the present embodiment may have a symmetric octagonal shape.

(First Supporting Section 221)

As illustrated in FIG. 4 to FIG. 6, the first supporting section 221 according to the present embodiment supports the metal plate 210 and connects the metal plate 210 to the feed point 40 formed on the circuit board 30.

In addition, as illustrated in FIG. 4 to FIG. 6, the first supporting section 221 according to the present embodiment may extend from an outer edge of the metal plate 210 toward a direction of the circuit board 30.

(Second Supporting Section 222*a* and Second Supporting Section 222*b*)

The second supporting sections 222*a* and 222*b* according to the present embodiment support the metal plate 210 and connect the metal plate 210 to a ground plane (not illustrated) formed on the circuit board 30.

In addition, as illustrated in FIG. 4 and FIG. 6, the second supporting sections 222*a* and 222*b* according to the present embodiment may extend from an edge of the opening 240 toward the direction of the circuit board 30. The opening 240 is made in the metal plate 210.

The first supporting section 221, the second supporting section 222*a*, and the second supporting section 222*b* allow the antenna 20 to stand on the circuit board 30.

(Extension Section 231 to Extension Section 234)

As illustrated in FIG. 4 to FIG. 6, the extension sections 231 to 234 according to the present embodiment extend from the outer edge of the metal plate 210 toward the direction of the circuit board 30 but have no contact with the circuit board 30.

In addition, one of features of the extension section 231 to the extension section 234 according to the present embodiment is to operate as perturbation elements that form the two excitation modes, the two excitation modes spatially having the substantially orthogonal relation.

As described above, the metal plate 210 according to the present embodiment has the symmetric shape. Therefore, to achieve the perturbative excitation, the extension sections 231 to 234 according to the present embodiment are formed in such a manner that the two excitation modes spatially having the substantially orthogonal relation have the respective current paths having different lengths.

More specifically, in the present embodiment, the lengths of two extension sections 231 and 234 that form one of the two excitation modes spatially having the substantially orthogonal relation are different from the lengths of two extension sections 231 and 234 that form the other of the two excitation modes.

For example, as illustrated in FIG. 5, the extension sections may be designed in such a manner that the length L1 of the extension section 131 is different from the length L2 of the extension section 233. In a similar way, the extension sections may be designed in such a manner that the length L2 of the extension section 132 is different from the length L1 of the extension section 234.

According to the above-described design, the excitation mode based on the extension section 231 and the extension section 234 of the length L1 and the excitation mode based on the extension section 232 and the extension section 233 of the length L2 have the respective current paths having different lengths. This can achieve the perturbative excitation.

In addition, the second supporting sections 222*a* and 222*b* according to the present embodiment may operate as the perturbation elements that form one of the two excitation modes spatially having the substantially orthogonal relation.

In the case where the second supporting sections 222*a* and 222*b* operate as the perturbation elements, there is no need to increase the difference between the length L1 and the length L2, and it is possible to prevent the extension sections from coming into contact with the circuit board 30.

(Opening 240)

As illustrated in FIG. 4 and FIG. 6, in the metal plate 210, the opening 240 according to the present embodiment is made between the extension sections 231 and 234 that form one of the two excitation modes spatially having the substantially orthogonal relation and between the extension sections 232 and 233 that form the other of the two excitation modes.

The opening 240 according to the present embodiment makes it possible to extend a current path between a tip of the extension section 231 and a tip of the extension section 234 and a current path between a tip of the extension section 232 and a tip of the extension section 233, and this makes it possible to further downsize the antenna 20.

<4. Array Antenna Structure>

Next, an array antenna structure including a plurality of the antennas 20 according to the second embodiment or the antenna 10 according to the first embodiment of the present embodiment will be described.

Figure 7:
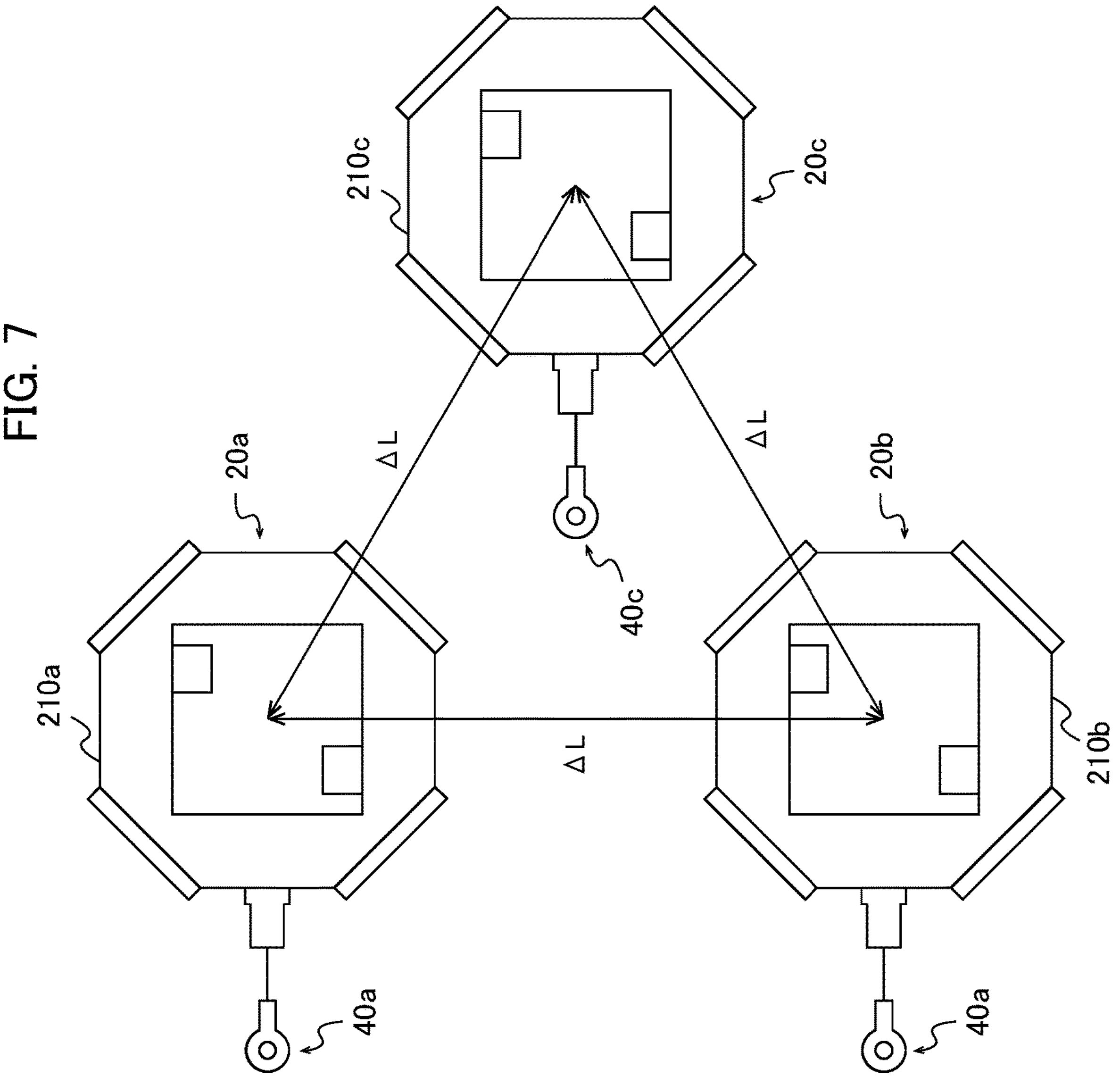
FIG. 7 is a diagram for describing an array antenna structure including a plurality of the antennas 20 according to the second embodiment of the present embodiment.

FIG. 7 is a diagram for describing the array antenna structure including the plurality of antennas 20 according to the second embodiment of the present embodiment.

As illustrated in FIG. 7, the plurality of antennas 20 may be disposed in the array antenna structure in such a manner that intervals between the plurality of antennas 20 form an equilateral triangle.

Note that, FIG. 7 illustrates the example in which reference points of the arrangement interval correspond to the centers of the metal plates 210 (centers of openings 240). However, the reference points may correspond to any points in the antennas 20, or may correspond to the feed point 40.

Note that, although not illustrated, the plurality of antennas 10 may also be disposed in the array antenna structure in such a manner that intervals between the plurality of antennas 10 form the equilateral triangle.

Here, $\Delta L$ ($\Delta L = D\lambda$) represents the length of the interval between the antennas 20.

In this case, the size of the array antenna decreases as $\Delta L$ gets shorter. However, there is a possibility that desired antenna performance is not obtained if $\Delta L$ is too short.

Therefore, the antennas 10 and the antennas 20 may be disposed in such a manner that the interval between the antenna and another similarly configured antenna is a designated length $D_0\lambda$ or more and a half or less of wavelength of the wireless signal compliant with the designated communication standard. The designated length $D_0\lambda$ is decided on the basis of an index.

Examples of the index include strength of mutual coupling of the antennas.

Figure 8:
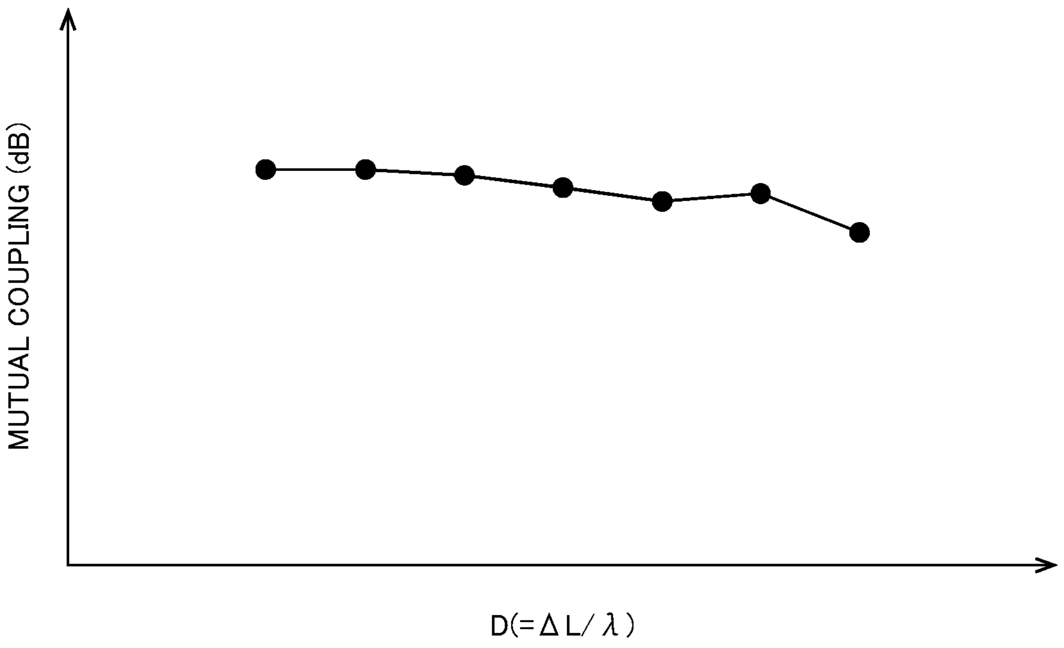
FIG. 8 is a graph illustrating a relation between strength of mutual coupling of the antennas 10 and intervals between the antennas 10 according to the first embodiment of the present invention.

FIG. 8 is a graph illustrating a relation between strength of mutual coupling of the antennas 10 and intervals between the antennas 10 according to the first embodiment of the present invention.

Figure 9:
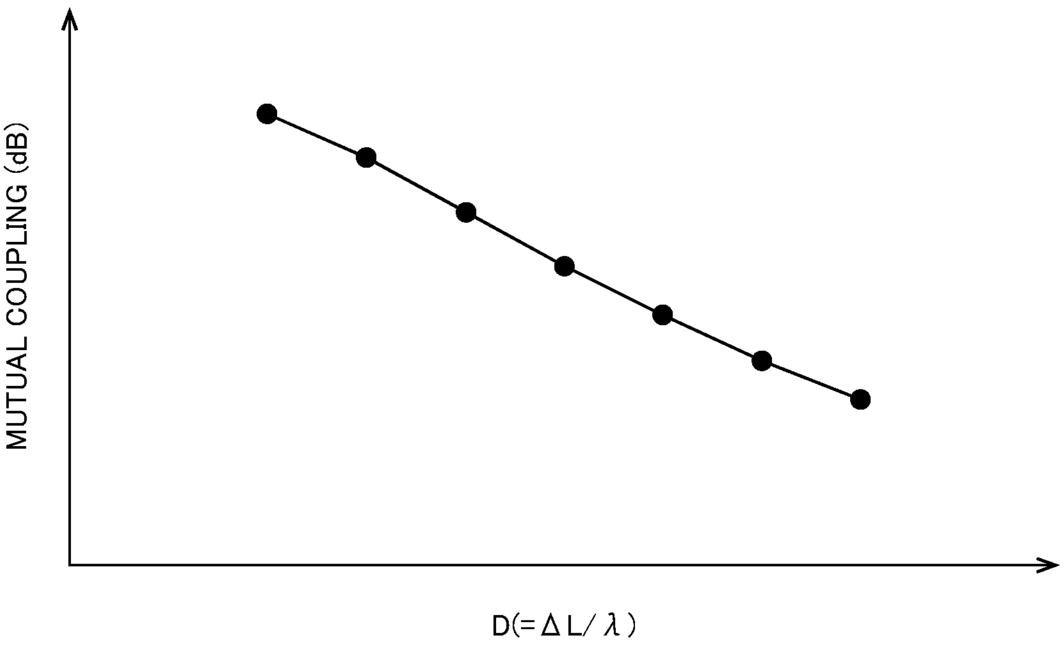
FIG. 9 is a graph illustrating a relation between strength of mutual coupling of the antennas 20 and intervals between the antennas 20 according to the second embodiment of the present invention.

FIG. 9 is a graph illustrating a relation between strength of mutual coupling of the antennas 20 and intervals between the antennas 20 according to the second embodiment of the present invention.

As illustrated in FIG. 8 and FIG. 9, the strength of the mutual coupling of the antennas decreases as the interval between the antennas gets shorter.

In addition, it is known that it becomes difficult to obtain the desired antenna performance in the case where the strength of the mutual coupling of the antennas is too weak.

Therefore, the arrangement interval between the antennas 10 or the arrangement interval between the antennas 20 may be designed in such a manner that the arrangement interval has the designated length $D_0\lambda$ or more, which allows the strength of mutual coupling of the antennas to be designated strength or more.

It is sufficient to decide the designated length $D_0\lambda$ in view of the desired antenna performance, a mutual coupling measurement result, and the like.

Note that, the index for deciding the designated length $D_0\lambda$ is not limited to the strength of mutual coupling of the antennas, but may be any index to be used for determining the antenna property.

<5. Supplement>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An antenna that transmits and receives a wireless signal compliant with a designated communication standard, the antenna comprising:

a metal plate that is disposed on a circuit board;

a first supporting section that supports the metal plate and connects the metal plate to a feed point formed on the circuit board;

at least one second supporting section that supports the metal plate and connects the metal plate to a ground plane formed on the circuit board; and a plurality of extension sections that extend from an outer edge of the metal plate toward a direction of the circuit board but have no contact with the circuit board;

wherein the plurality of extension sections operate as perturbation elements that form two excitation modes, the two excitation modes spatially intersecting with one other, wherein four extension sections are configured to operate as the perturbation elements that form the two excitation modes, the two excitation modes spatially having a substantially orthogonal relation, wherein lengths of two extension sections that form one of the two excitation modes spatially having a substantially orthogonal relation are different from lengths of two extension sections that form the other of the two excitation modes, wherein an opening is provided among the two extension sections that form one of the two excitation modes and the two extension sections that form the other of the two excitation modes, the two excitation modes spatially having the substantially orthogonal relation, and wherein the antenna further comprises two second supporting sections configured to connect an edge of the opening to the ground plane and operate as the perturbation elements that form one of the two excitation modes, the two excitation modes spatially having the substantially orthogonal relation.

2. The antenna according to claim 1, wherein the metal plate and the plurality of extension sections are formed in such a manner that the two excitation modes spatially intersecting with one other have respective current paths having different lengths.

3. The antenna according to claim 1, wherein the antenna is disposed in such a manner that an interval between the antenna and another similarly configured antenna is a designated length or more and a half or less of wavelength of the wireless signal compliant with the designated communication standard.

4. The antenna according to claim 1, wherein the designated communication standard includes ultra-wideband wireless communication.

* * * * *